C. A. ROBINSON.
MACHINE FOR STAINING AND TREATING SHINGLES.
APPLICATION FILED NOV. 2, 1918.

1,325,110. Patented Dec. 16, 1919.
4 SHEETS—SHEET 3.

Witness
Inventor,
C. A. Robinson
By C. A. Snow & Co.
Attorneys.

C. A. ROBINSON.
MACHINE FOR STAINING AND TREATING SHINGLES.
APPLICATION FILED NOV. 2, 1918.

1,325,110.

Patented Dec. 16, 1919.
4 SHEETS—SHEET 4.

Witness

Inventor,
C. A. Robinson
By C. A. Snow & Co.
Attorneys.

UNITED STATES PATENT OFFICE.

CHARLES ALLEN ROBINSON, OF OKLAHOMA, OKLAHOMA.

MACHINE FOR STAINING AND TREATING SHINGLES.

1,325,110.  Specification of Letters Patent.  Patented Dec. 16, 1919.

Application filed November 2, 1918. Serial No. 260,817.

*To all whom it may concern:*

Be it known that I, CHARLES A. ROBINSON, a citizen of the United States, residing at Oklahoma, in the county of Oklahoma and State of Oklahoma, have invented a new and useful Machine for Staining and Treating Shingles, of which the following is a specification.

It is the object of this invention to provide a simple means for treating shingles and like objects with a coloring solution, a liquid preservative or the like, novel means being provided for operatively connecting and driving the various movable parts. But one form of the invention is shown; nevertheless, a mechanic may work changes within the scope of the skill of his craft without departing from the spirit of the invention.

Figure 1:
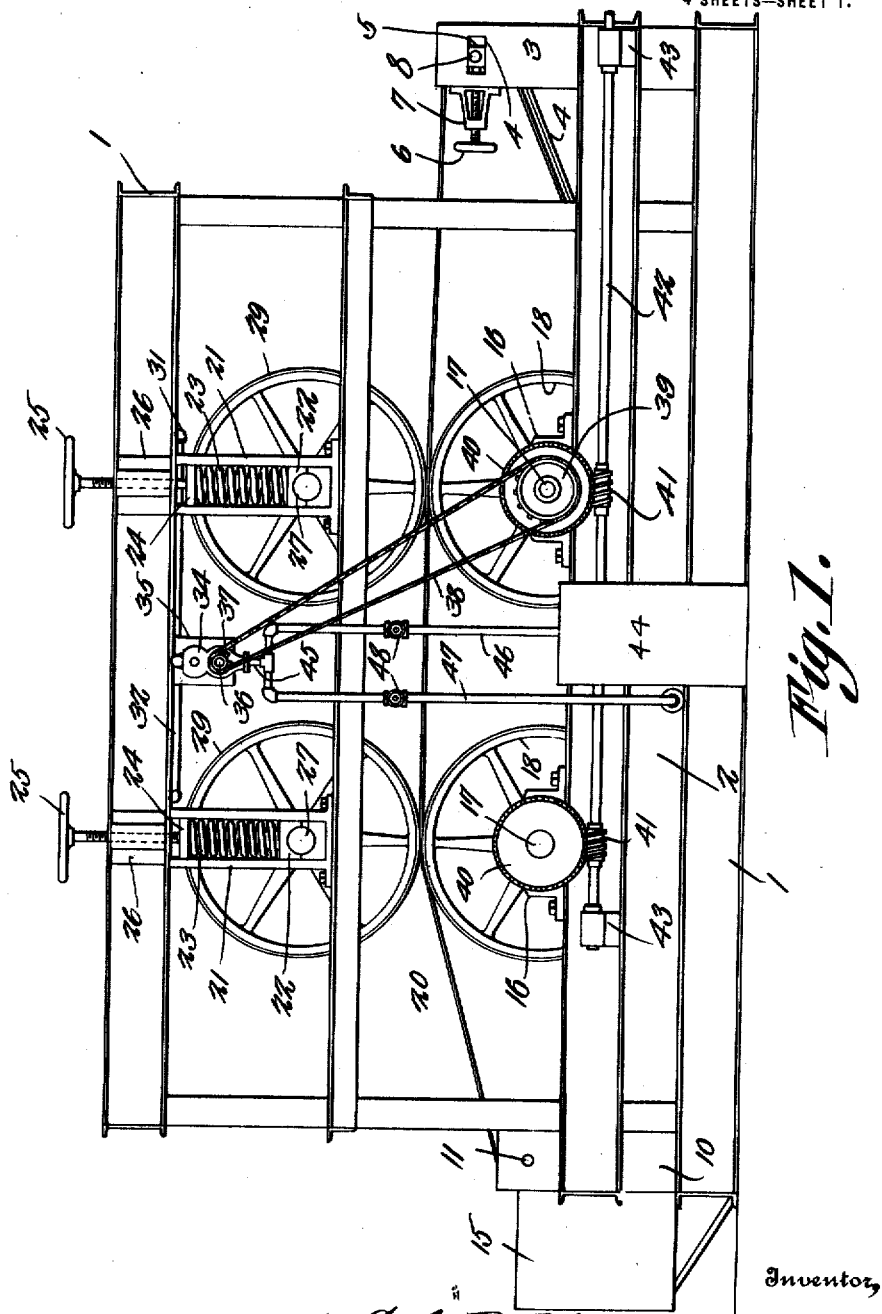
Figure 2:
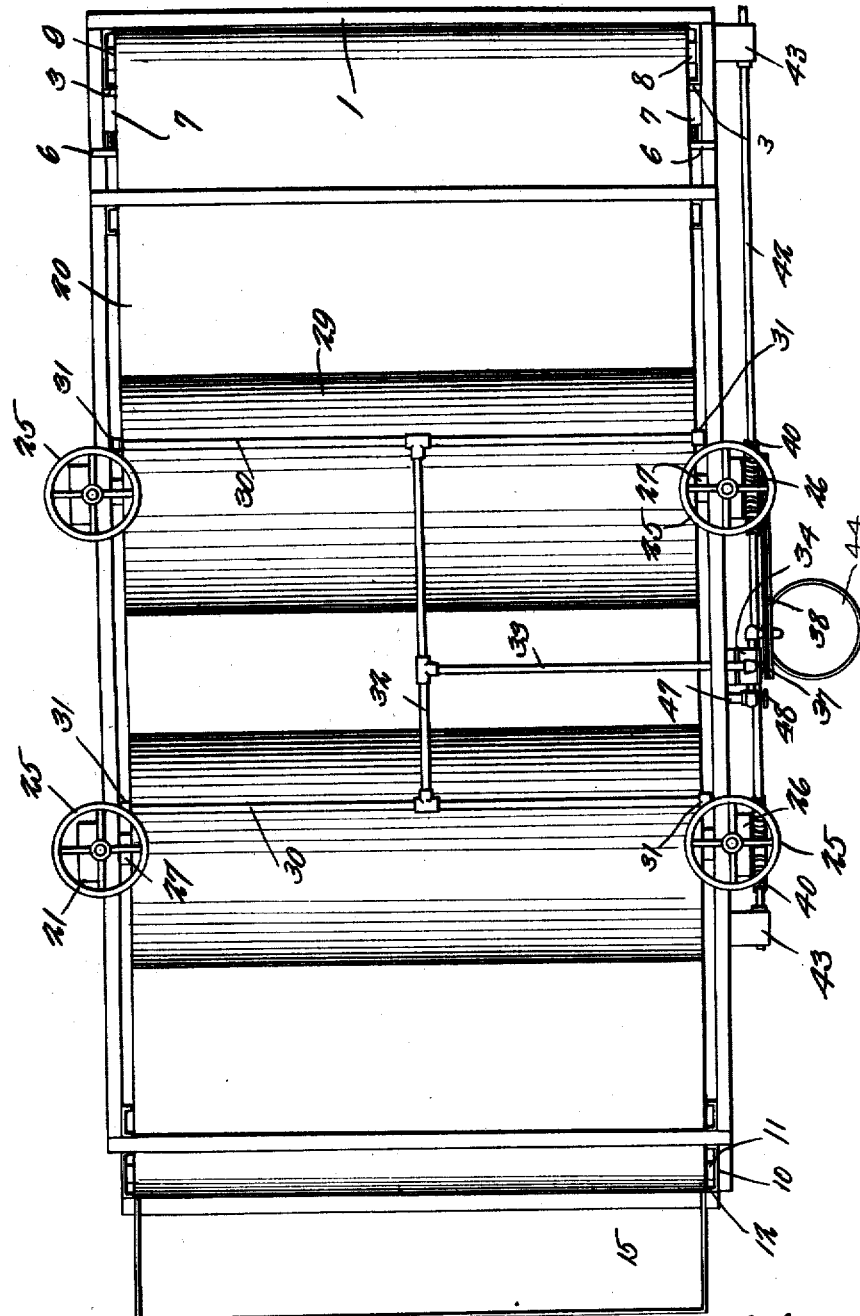
Figure 3:
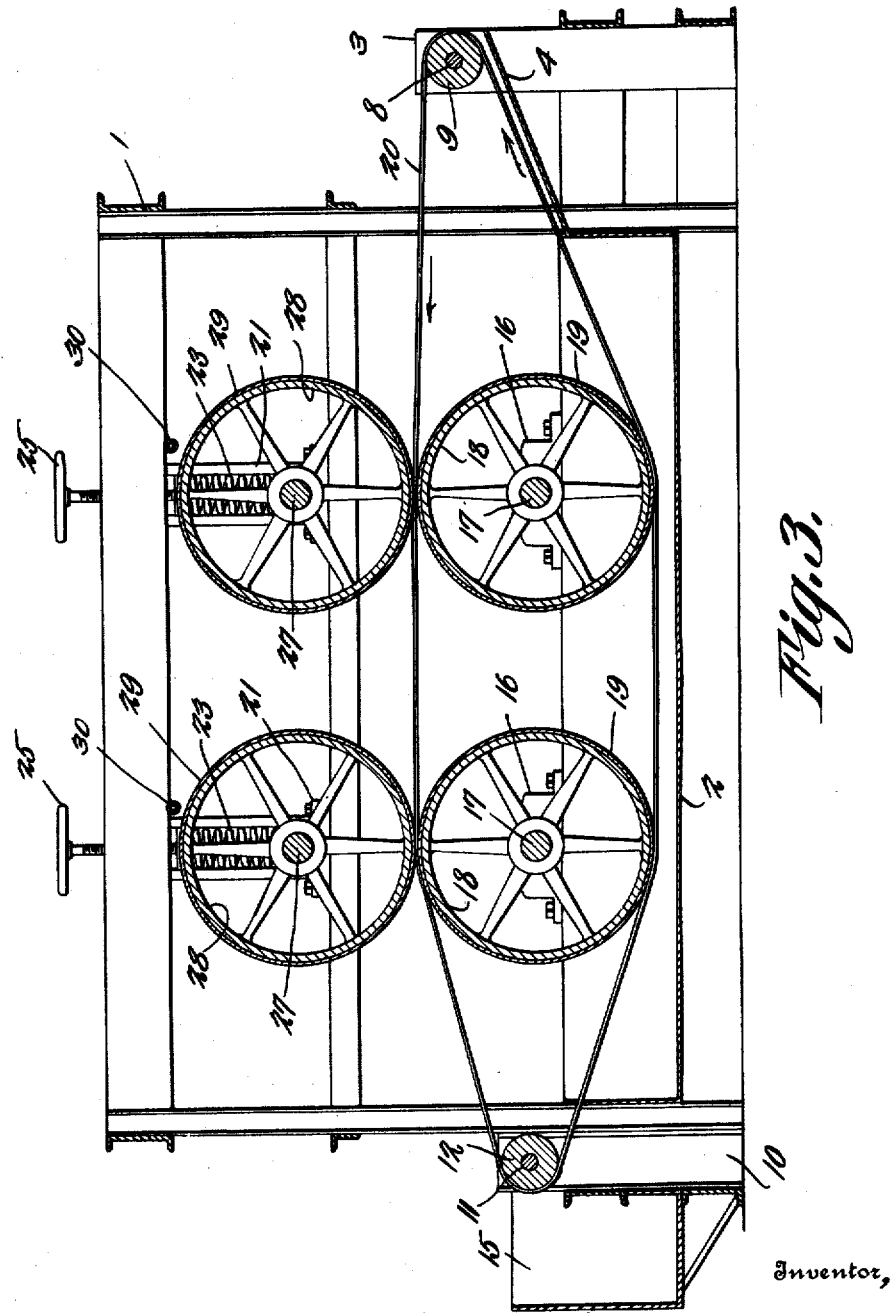
Figure 4:
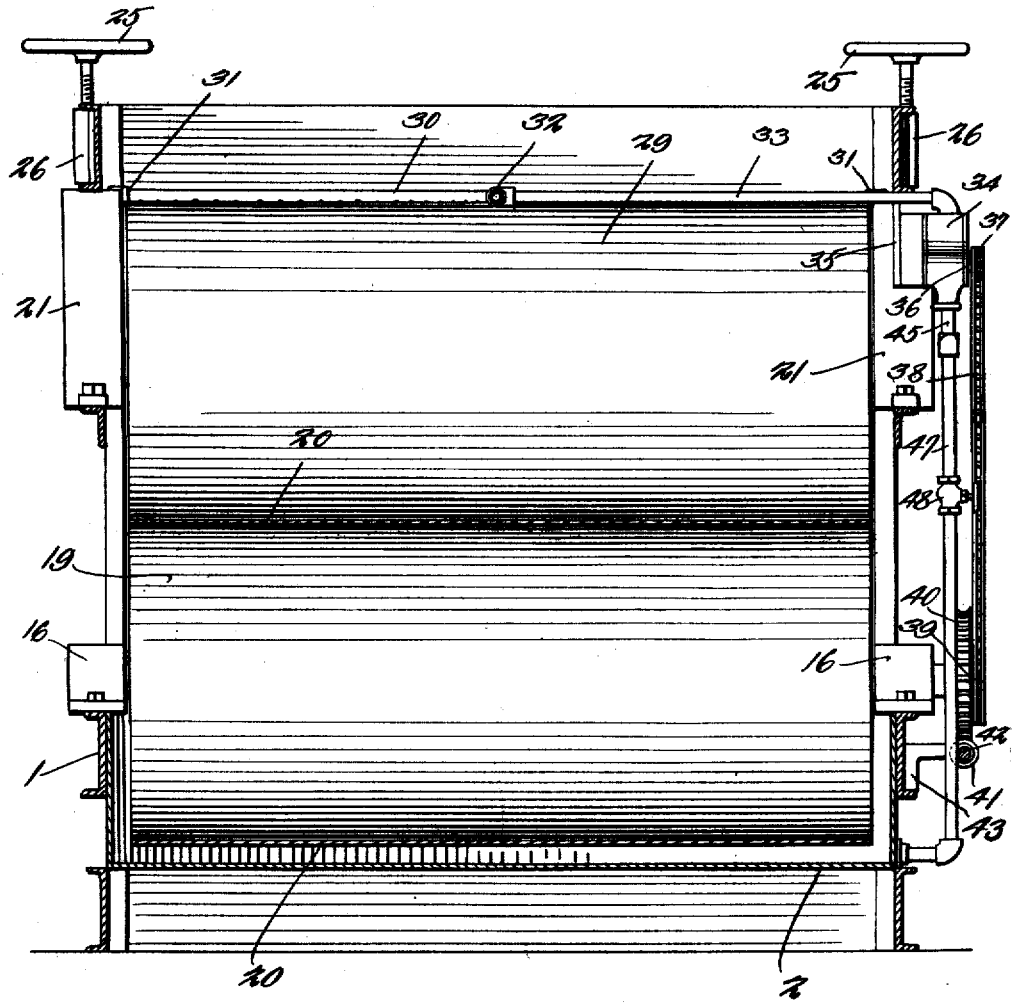

In the drawings:—Figure 1 is a side elevation; Fig. 2 is a top plan; Fig. 3 is a longitudinal section; Fig. 4 is a cross section.

A frame 1 of any sort is provided, and carries a pan 2, there being standards 3 at one end of the frame, having slots 4, receiving slidably, bearings 5 adjusted by screws 6 threaded into brackets 7 on the standards, a shaft 8 being journaled in the bearings, and carrying a roller 9. Standards 10 are located at the opposite end of the frame 1 and in them, there is journaled a shaft 11 carrying a roller 12. An inclined chute 14 extends beneath the roller 9 and leads to the pan 2, the chute being supported by the standards 3 and the pan. A receiver 15 is assembled with the frame 1 close to the roller 12.

Lower bearings 16 are mounted on the frame 1 and shafts 17 are journaled in the bearings, the shafts carrying lower drums 18 provided with soft absorbent treads 19. A belt conveyer 20 is passed about the rollers 9 and 12, the upper run of the conveyer engaging the upper portions of the drums 18, and the lower run of the conveyer engaging the lower portions of the drums. The lower run of the conveyer 20 moves through the pan 2, and the drums 18 dip into the pan.

Guides 21 are mounted on the sides of the frame 1, bearings 22 being mounted for vertical adjustment in the guides, the bearings being engaged by the lower ends of compression springs 23, the upper ends of which bear against pressure blocks 24 slidable in the guides and under the control of screws 25 threaded into offset members 26 on the upper part of the frame 1. Shafts 27 are journaled in the bearings 22. Upper drums 28 are mounted on the shafts 27 and, under the compulsion of the springs 23, the upper run of the conveyer 20 is pressed adjustably between the drums 28 and 18, the drums 28 having soft absorbent treads, like the treads 19 of the drums 18.

Perforated transverse spray heads 30 discharge on the upper drums 28, and are closed at their ends by caps 31. The heads 30 are united by a pipe 32 having a branch 33 leading to a pump 34 which may be of the rotary type, the pump being mounted on a hanger 35 depending from a part of the frame 1. The shaft 36 of the pump 34 supports a sprocket wheel 37 around which is trained a chain 38 coöperating with a sprocket wheel 39 on one of the lower drum shafts 17. A pipe 45 is connected with the pump 34 and is provided with branches 46 and 47, the branch 47 leading to the pan 2, and the branch 46 leading to a receptacle 44, which is independent of the pan and represents a source of supply of any kind.

A shaft 42 is mounted to rotate in bearings 43 on the frame 1 and, preferably, is power-driven by any suitable means (not shown). Worms 41 on the shaft 42 coöperate with worm wheels 40 on the shafts 17.

The conveyer belt 20 and the coverings or treads 19 of the lower drums 18 are wet with the liquid in the pan 2, the coverings 29 of the upper drums 28 being wet with the material discharged through the heads 30. Any liquid carried out of the pan 2 by the lower run of the belt conveyer 20 is received by the chute 4 and returned to the pan. The shingles are placed on the conveyer 20 adjacent to the roller 9 and move forwardly, the shingles passing between the drums 18 and 28. The conveyer 20 is wet with the liquid which it has acquired from the pan 2, the upper drums 28 being wet with the liquid which the heads 30 have supplied. Therefore, as the shingles move along, they will be coated on the upper and lower surfaces, uniformly and thoroughly. The shingles are subjected to a firm but yielding pressure, because the soft treads 19 and 29 are provided, and since the treads 29 are soft and absorbent, the liquid proceeding from the heads 30, will be held and conveyed to the shingles. The conveyer 20 may be absorbent, and if this construction is resorted to, the absorbent treads 19 on the lower drums 18 aid in moistening the conveyer, at its upper run, in addition to the liquid which the conveyer has carried out of the pan 2. Surplus liquid from the heads 30, or squeezed out of the conveyer 20 between the drums 28 and 18, will be returned to the pan 2. The upper drums 28 are driven by contact from the conveyer 20, the conveyer being operated by contact with the lower drums 18, and the lower drums being driven from the shaft 42 by the worms 41 and the worm wheels 40. From one shaft 17, motion is transmitted to the pump 34 by the sprocket wheel 39, the chain 38 and the sprocket wheel 37. Liquid may be supplied to the heads 30 through the branch 47 from the pan 2, or from the receptacle 44 through the branch 46, the valves 48 being manipulated accordingly. If it is desired to freshen up the liquid in the pan 2, or to make a mixture, the branches 47 and 46 may be opened simultaneously, by a judicious operation of the valves 48.

I claim:—

1. In a device of the class described, upper and lower drums; a belt conveyer having its upper run extended between the drums in contact therewith; a pan into which the lower run of the conveyer and the lower drum dip; a receptacle independent of the pan; a liquid supply conduit discharging on the upper drum and having branches communicating respectively with the pan and the receptacle; a pump in the conduit; and valves, under the control of an operator, in the branches.

2. In a device of the class described, upper and lower drums; a belt conveyer having it upper run extended between the drums in contact therewith; a pan into which the lower run of the conveyer and the lower drum dip; a conduit having branches, one of which branches is a supply branch, the other of which branches, communicates with the pan, the conduit discharging on the upper drum in spaced relation to the conveyer; a pump in the conduit and located to produce a flow through either branch; and means under the control of an operator for closing either branch.

3. In a device of the class described, a frame; lower drums journaled on the frame; upper drums journaled on the frame; a belt conveyer having its upper run extended between the drums, in contact with the upper and lower drums; a pan on the frame, whereinto both lower drums and the lower run of the belt conveyer dip; a conduit having spray heads discharging on the upper drums in spaced relation to the upper run of the belt conveyer, the conduit embodying branches, located at one side of the frame, between the pairs of upper and lower drums, one branch being a supply branch, and the other branch communicating with the pan; means under the control of an operator for closing either branch; and a pump in the conduit and located to produce a circulation through either branch.

In testimony that I claim the foregoing as my own I have hereto affixed my signature in the presence of two witnesses.

CHARLES ALLEN ROBINSON.

Witnesses:
C. M. TYLER,
F. W. KRAMER.